United States Patent [19]

Rudolph et al.

[11] Patent Number: 4,517,748
[45] Date of Patent: May 21, 1985

[54] MEASURING BRIDGE FOR DETERMINING MOTOR VEHICLE DAMAGE

[76] Inventors: Ronald M. Rudolph, 3604 Ea. Garden Pl., Oak Creek, Wis. 53154; Daniel P. Wendl, W225 S4569 Guthrie Rd., Waukesha, Wis. 53186

[21] Appl. No.: 581,966

[22] Filed: Feb. 21, 1984

[51] Int. Cl.³ .......................... G01B 5/14; G01B 5/25
[52] U.S. Cl. .............................. 33/180 AT; 33/288; 33/562; 33/533
[58] Field of Search .......... 33/27 C, 174 R, 174 L, 33/174 P, 174 PA, 174 G, 180 AT, 181 AT, 288; 72/705

[56] References Cited

U.S. PATENT DOCUMENTS

| | | | |
|---|---|---|---|
| 4,165,567 | 8/1979 | Olsson | 33/180 AT X |
| 4,174,623 | 11/1979 | LeGrand et al. | 33/180 AT X |
| 4,242,803 | 1/1981 | Dory | 33/174 G X |
| 4,319,402 | 3/1982 | Martin | 33/181 AT X |
| 4,329,784 | 5/1982 | Bjork | 33/181 AT X |
| 4,342,154 | 8/1982 | LeGrand | 33/288 X |
| 4,479,305 | 10/1984 | Wendl et al. | 33/288 X |

*Primary Examiner*—Robert S. Ward

[57] ABSTRACT

A measuring bridge for determining the degree of motor vehicle damage includes a main frame which defines a reference plane and has a plurality of locating holes formed therein. Vehicle support means is mounted on the main frame in a predetermined relation to the locating holes for supporting a vehicle on the main frame with datum points beneath the vehicle being in a predetermined orientation relative to the locating holes. A first measuring gauge includes an elongate bar affixed to the locating holes and oriented below and in parallelism with the vehicle's center line and slide means mounted for longitudinal movement on the elongate bar. Slideably mounted on the slide means for transverse movement perpendicular to a plane containing the axis of the first elongate bar is an elongate measuring element. A second measuring gauge includes a second elongate bar, second slide means mounted on the second elongate bar for movement longitudinally thereon, second elongate measuring means mounted on the second slide for movement in a direction perpendicular to the reference plane, and a third elongate measuring element mounted adjacent one end of the second elongate bar for movement perpendicular to the reference plane and spaced from the second measuring element. Magnetic means are mounted adjacent the opposite ends of the second elongate bar so that the same may be releasably affixed to the main frame in an angular relation to the first elongate bar whereby the correct position of datum points on vehicle's relative to each other can be determined three-dimensionally.

7 Claims, 7 Drawing Figures

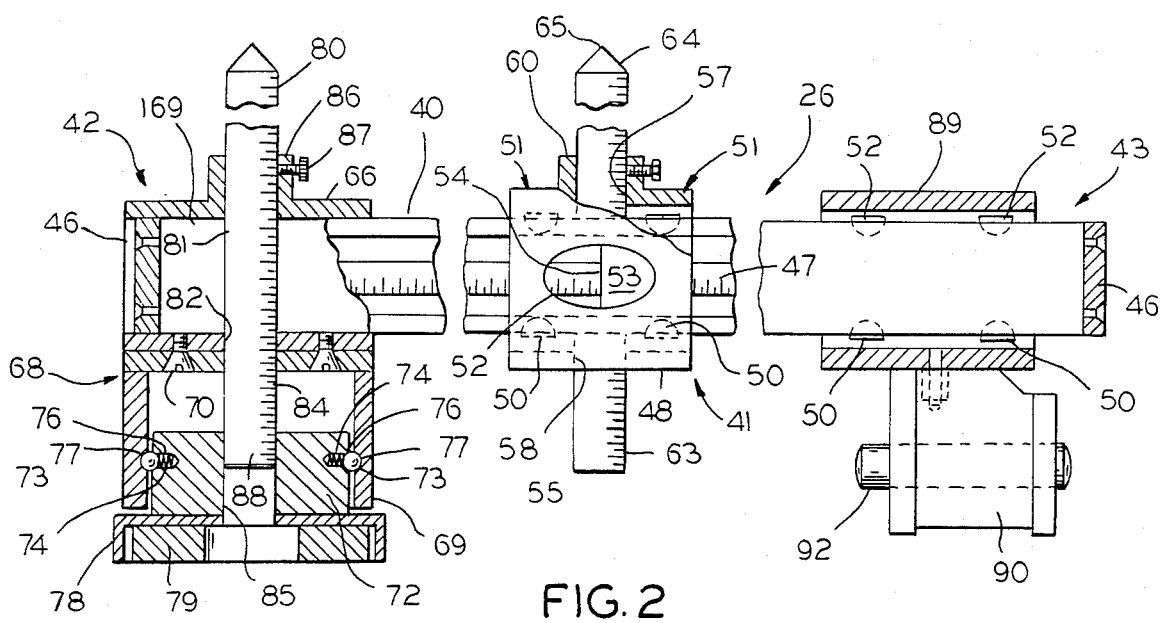
FIG. 2
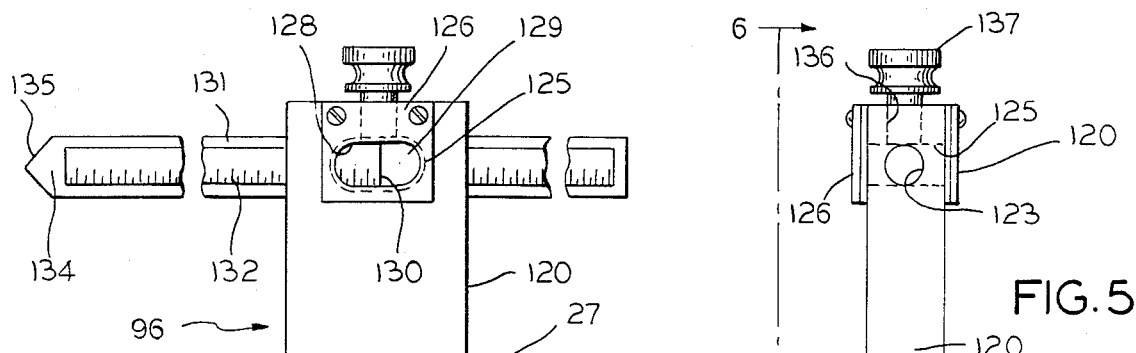
FIG. 6
FIG. 5
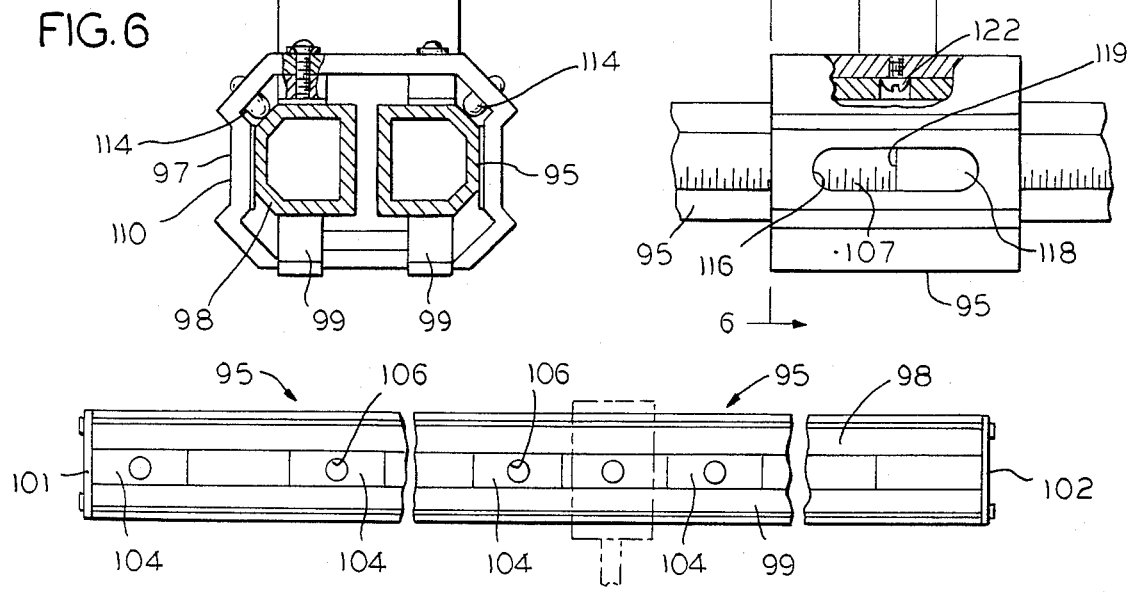
FIG. 7

MEASURING BRIDGE FOR DETERMINING MOTOR VEHICLE DAMAGE

BACKGROUND OF THE INVENTION

This invention relates to an improved measuring bridge for use in the repair of damaged motor vehicles.

Before a damaged motor vehicle can be repaired, it is necessary to determine the extent to which the location of various datum points in the vehicle deviates from manufacturer's specifications. Repair is then achieved by reforming damaged portions of the vehicle until all datum points have been returned to their correct relative positions. Proper repair of body damage is particularly important in vehicles which do not have a frame since accurate body alignment is essential for proper vehicle suspension and steering.

Apparatus for measuring the alignment of vehicle bodies are commonly called measuring bridges. Such assemblies generally include a fixed frame having a plurality of fixtures upon which the vehicle is supported either by clamps mounted on the measuring bridge support plates, or by fixtures mounted on the bridge's support frame and which are engaged by datum points on the underside of the vehicle. The deviation, if any, of other key datum points on the vehicle from manufacture specifications are determined by measuring devices extending outwardly from the vehicle's center line. However, such prior art measuring systems did not readily permit accurate measurements between datum points on the vehicle.

SUMMARY OF THE INVENTION

It is an object of the invention to provide a new and improved measuring bridge.

A further object of the invention is to provide a measuring bridge which permits accurately measuring the relative positions of datum points on widely spaced locations on a vehicle These and other objects and advantages of the present invention will become more apparent from the detailed description thereof taken with the accompanying drawings.

In general terms, the invention comprises a measuring bridge including a main frame defining a reference plan, indexing means on the frame defining coordinates in the reference plane, first and second portable gauge means releasably mountable on the frame for determining the relative position of datum points on damaged portions of a vehicle relative to a referenced datum point, and a plurality of support assemblies. Coupling means are provided for securing each support assembly in a discreet location relative to the reference plane and spaced a predetermined distance from each of the other support assemblies, with each support assembly being adapted to be engaged by one of a plurality of datum points on the under side of a vehicle for supporting the vehicle in a predetermined orientation relative to the reference plane and the coordinates therein. The first portable gauge means includes elongate bar means, first means for securing the bar means to the indexing means of the main frame whereby the first bar means is affixed in the plane and lying in parallelism with the center line of the vehicle. A first measuring device is slidably mounted on the bar means and has an elongate measuring element mounted thereon for movement in a direction normal to the vehicle center line. The second portable gauge means includes an elongate beam means and second means for releasably securing the beam means on the main frame independently of the indexing means. The second bar means is rotatably mounted about the second means and a second elongate measuring element is mounted on the second means for vertical movement in a direction normal to the reference plane for locating a first datum point below the vehicle. A second measuring device is slidably mounted on the bar means and has a third measuring element mounted thereon for movement in a direction normal to the reference plane. The second bar means is pivotal into engagement with the end of the first elongate measuring element to locate the third elongate element in predetermined coordinates relative to the reference plane and the elevation of the upper end of the third elongate element three dimensionally locating a second datum point below the vehicle relative to the first datum point and to the reference plane.

BRIEF DESCRIPTION OF THE DRAWINGS

FIG. 2 shows one of the gauges which forms a part of the measuring bridge shown in FIG. 1;

FIG. 5 is a slide elevation view with parts broken away of another one of the gauges which forms a part of the measuring bridge of FIG. 1;

FIG. 6 is a view taken along line 6—6 of FIG. 5; and

FIG. 7 is a top plan view of the gauge shown in FIGS. 5 and 6.

DETAILED DESCRIPTION OF THE PREFERRED EMBODIMENT

Figure 1:
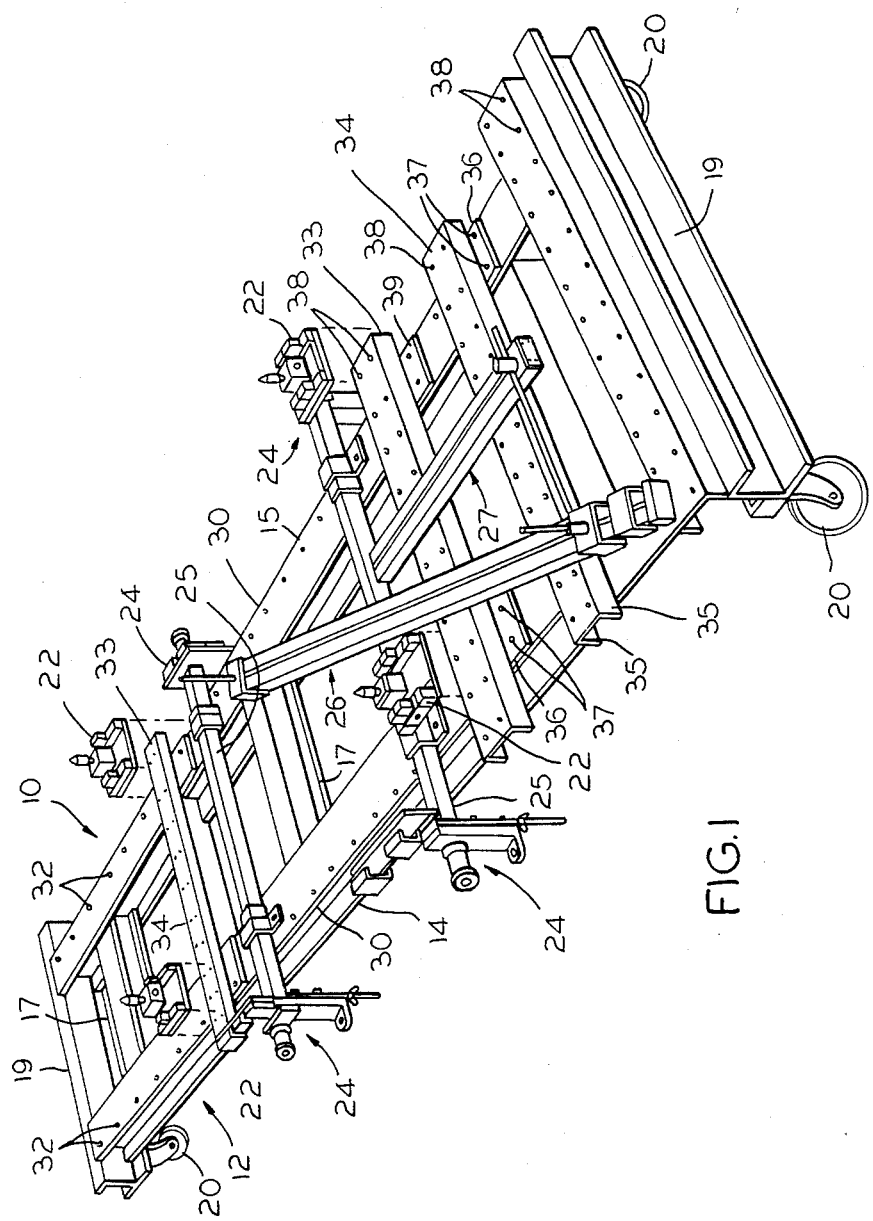
FIG. 1 is a perspective view of a preferred embodiment of the invention.

A measuring bridge 10 is illustrated in FIG. 1 to include a main frame 12 having a pair of parallel, spaced apart main beams 4 and 15 and a plurality of cross beams 17 extending between the main beams and secured thereto in a suitable manner, such as by welding. In addition an end member 19 is suitably affixed at each end of the frame 12 and extends between the main beams 14 and 15. Suitable rollers or casters 20 may be affixed below the opposite ends of each piece 19 to rollably support the measuring bridge 10. The main beams 14 and 15 are shown in FIG. 1 to comprise I-beam members, and will be appreciated by those skilled in the art that any suitable structure or shape may be employed.

The vehicle being repaired is supported on the main frame 12 by means of a plurality of support assemblies 22 which may be mounted in the main frame 12 in a plurality of predetermined discreet locations depending upon the specifications of the particular vehicle. In particular, the assemblies 22 are constructed and arranged to be engaged for support by datum points on the underside of the vehicle, which if undamaged, will have a predetermined spacial relation. This locates some datum points on the vehicle relative to the frame 12. And with the vehicle's center line positioned in a verticle plane which also contains the center line of the frame.

A plurality of clamps 24 are affixed to the main frame 12 by means of a pair of bars 25. It will be appreciated that one clamp 24 will be mounted on each end of the bars 25 and each clamp 24 may be of the type which is constructed and arranged to grip the pinch weld seam on the underside of a uni-body type vehicle, for example. The details of the clamps 24 are not a part of the invention and accordingly will not be discussed in detail for the sake of brevity. The main frame 12 also supports a pair of gauges 26 and 27 for determining the position of vehicle datum points relative to specifications.

The main beams 14 and 15 are constructed and arranged such that their upper flanges 30 are coplaner and each has a row of precisely spaced apart apertures 32 extending longitudinally from one end to the other. This establishes a reference plane and primary longitudinal reference coordinates or locations for the system. The flanges 30 support a plurality of spaced apart transversely extending support members 33 each of which has an inverted U-shape in transverse cross-section and is defined by a center web portion 34 and a pair of downwardly extending side portions 35 whose lower edges rest atop the main beam flange 30. In addition, a pair of flanges 36 extend laterally from one side of each member 33 and are spaced apart a distance equal to that between the main beams 14 and 15. In addition, a pair of holes 37 are formed in each flange 36 and are spaced apart a distance equal to that between the openings 32 in the main beams 14 and 15. In this manner, the support members 34 may be affixed and the main beams 14 and 15 by bolts at a plurality of discreet locations defined by the location of the holes 32. The web portion 34 of each transverse beam 33 also has two rows of spaced apart apertures 38 extending therealong in spaced apart relation to permit the attachment of support assemblies 22 thereon. The details of the support assemblies 22 form no part of the present invention, and accordingly will not be discussed in detail herein. For more complete description of the devices, reference is made to application Ser. No. 357,581, now U.S. Pat. No. 4,479,305, filed Mar. 12, 1982 and assigned to the assignee of the present invention.

Figure 3:
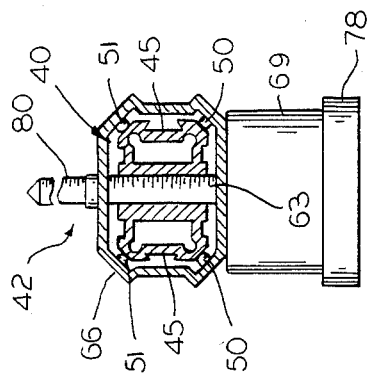
FIG. 3 is a view taken along lines 3—3 of FIG. 2.
Figure 4:
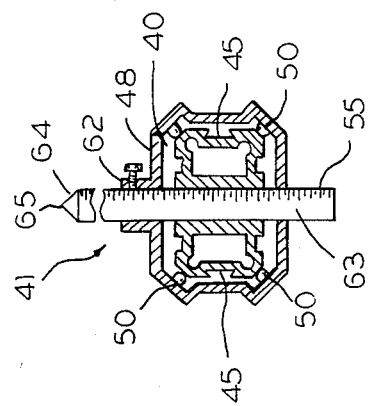
FIG. 4 is an end view of the gauge illustrated in FIG. 3.

Reference is now made to FIGS. 1-4 which show the first gauge 26 to include an elongate beam 40 having an indicating device 41 slideably mounted thereon and a pair of end supports 42 and 43. The beam 40 is shown in FIGS. 2, 3 and 4 to comprise a pair of elongate beam members 45 which are generally D-shaped and transverse cross-section and are held in a back-to-back, spaced apart relation, by end plates 46 to which they are suitably secured. On the outer face of each beam member 45 and extending for substantially the entire length thereof is a measuring scale 47.

The indicating device 41 includes a slide 48 shown in FIG. 4 to be hollow and to have an internal configuration similar to the outer configuration of the beam 40 and spaced therefrom. In addition, generally U-shaped spring members 50 are affixed to the internal surface of slide 48 at each of its lower corners and at its opposite ends for resiliently engaging corresponding outer surfaces on the beam members 45. There are also pairs of nylon buttons 51 affixed to the internal surface of slide 48 along its upper margin. This permits the slide 48 to move along beam 40 and to be resiliently held in position when set. An opening 52 is formed in each side of slide 48 and there is a plate 53 covering one side of the opening 52 so that its edge 54 lies in a plane containing the center of slide 48 whereby the latter can accurately be located on beam 40.

Indicating device 41 also includes an elongate rod-like indicating member 55 which extends between beam members 45 and is through aligned openings 57 and 58 formed in the upper and lower portions of carrier 48. There is also a collar 60 affixed to carrier 50 about opening 57 for stabilizing the indicating element. A set screw 62 extending through collar 60 so that the indicating member 55 may be fixed in a predetermined vertical position relative to beam 40 and carrier 50. Indicia 63 may be formed on the outer surface of indicating member 55 so its vertical position can be readily determined. In addition to the upper end 64 of member 55 may be conical to define a tip 65 which may be positioned at a datum point on the lower portion of the vehicle.

The support 42 includes a sleeve member 66 which telescopingly engages the end of beam 40. As seen in FIG. 8, the inner surface of sleeve member 66 and the mating outer surface of beam 40 are complimentary. A base assembly 68 is disposed below sleeve 66 and includes an inverted, cup-shaped housing 69 which is secured by screws 70 to the underside of sleeve member 66. An annular body 72 is disposed adjacent the lower end of housing 69 and has a plurality of balls 78 disposed in recesses 74 arranged around its periphery and urged by springs 76 into engagement with an annular groove 77 formed around the inner periphery of housing 69. Affixed to the lower end of body 72 is an inverted shallow dished member 78 and to which an annular magnet 79 is secured. It will be appreciated that the body 72 and the magnet 79 are rotatably mounted by means of balls 73 and groove 77 relative to the remainder of the base assembly 68 and the beam 40.

An indicating member 80 which is identical to element 55 extends through aligned openings 81, 82 and 84 in the upper and lower portions of the sleeve 60 and the housing 69 respectively and into the hollow interior 85 of body 72. Member 80 may be fixed in a desired vertical position by means of the collar 86 affixed to member 66 in surrounding relation to opening 81 and a set screw 87. A scale 88 is also formed on the surface of member 80.

The support 43 at the opposite end of the indicator 26 comprises a sleeve 89 for slideably engaging the bar 40 and a magnet 90 fixed to the bottom 89. Magnet 90 is of the type wherein the magnetic effects can be blocked and unblocked by alternately depressing a push button 92 extending therefrom. One such magnet is part No. 657P manufactured by L. S. Starrett Co. of Athal, Mass. The sleeve 89 is similar in its outer configuration to the slide 48 of indicating device 41 and springs 50 and nylon buttons 52 for slideably retaining the assembly 43 on the beam 40.

The gauge 27 includes a bar 95 and a slide assembly 96. The bar 95 is similar to the beam 40 and includes a pair of elongate rails 98 and 99 held in a parallel, spaced-apart relation by end plates 101 and 102 and a plurality of equispaced cross members 104. Each of the cross members 104 has a hole 106 formed therein to permit connection to the transverse beams 33. A scale 107 is disposed on the outwardly facing surface of each rail 98 and 99. Although the scales are illustrated only with respect to a portion of each rail, there it will be understood that the scales 107 extend from end to end.

The slide assembly 96 includes a slide 97 which has the same cross sectional configuration as the carrier member 48 and includes a spring 99 affixed to its inner surface for resiliently engaging the lower surfaces of the rails 98 and 99. There are also pairs of nylon members 101 and 102 affixed to the inner surface of slide 97 adjacent its upper end to permit the slide assembly 96 to slide along the rails 98 and 99 without binding. An elongate, generally oval window 116 is formed in each side of the slide 110 and there is a cover plate 118 disposed over one half of the window 116 such that the edge 119 of plate 118 is coincident with the center line of the slide 97.

A generally rectangular block 120 is mounted with its lower end abutting the upper surface of the slide 110 and along its horizontal center line where it is secured by screws 122. A bore 123 extends through the block 120 and adjacent its upper end. The bore 123 is oriented in a direction transverse to the longitudinal axis of the slide 110 and the axis of the bore 123 lies in a plane containing the edges 119 of plates 118. This positions the bore 123 along the vertical center of slide 97. Also formed in the upper end of the block 120 is a second opening 125 which extends from side to side and is generally normal to the bore 123. Affixed over each end of opening 125 is a cover plate 126 having a generally oval opening 128 formed therein and slightly smaller than the hole 125. A cover 129 is fixed over one side of each hole 128 so that its edge 130 lies along the center line of the block 120 and the slide 97. Extending through the bore 123 is an elongate rod-like measuring device 131 having a scale 132 provided on each of its sides. In addition, one end 134 member of 131 is conical to provide a point 135 coincident with the axis of bore 123. A threaded opening 136 is formed in the upper end of block 120 and normal to the bore 123 for receiving a set screw 137 for clamping the measuring device 131.

The measuring bridge 10 permits an operator to precisely locate any point on the underbody of a motor vehicle three dimensionally. In operation of the assembly, the vehicle is first positioned on the support assemblies 21 so that it is precisely located both vertically and horizontally relative to the main frame 12. The vehicle is then secured in this position by means of the clamps 24.

After the vehicle has been positioned, the transverse members 34 are located such that one is directly in front of or behind the point on the vehicle whose position is to be located. The gauge 27 is then positioned on the transverse members 33 so that the openings 106 correspond to those openings 38 which define the center line of the vehicle. The gauge 27 is then fixed in this position by means of bolts so that it lies precisely below the center line of the vehicle. The gauge 26 is then positioned with the indicating element 80 of the end support 42 coaxial with and beneath one critical datum point on the vehicle. The element 80 is then raised into engagement with the vehicle datum point. If this point is a bolt, the conical upper end of member 80 will be positioned in engagement within the center of the bolt. On the other hand, if the datum point comprises a hole, the tip of the member 80 will engage the edge of the hole. The attraction between magnet 79 and the ferrous metal of the main frame 12 firmly holds the end assembly 42 in the position just located. The magnet 89 of the end assembly 42 however is turned off.

After one end of the gauge 27 has been located, the slide 48 is moved along the bar 40 a distance indicated on the specification sheet for the particular vehicle. The slide assembly 96 on the gauge 27 is similarly moved to a position on bar 95 indicated by vehicle specifications. The elongate measuring device 131 is then extended laterally a distance which is also indicated by the vehicle specifications after which it is clamped by the screw 137. The gauge 26 is then pivoted about the axis of the measuring element 80 until the collar 60 is engaged by the tip 135 of the member 130. The button of the magnet 90 is then depressed whereby the latter becomes magnetically coupled to the main frame 12. The opposite ends of the gauge 26 are thus magnetically fixed in position. Indicating member 55 is then elevated to position its upper end at an elevation dictated by vehicle specifications. This point then fixes the correct position of a second datum point on the vehicle. If this point is defined by a bolt, the tip 65 defines the proper position from the bolt center line. On the other hand, if the datum point is a hole, a distance of one half the hole diameter should be added when positioning the slide 48 so that the hole edge may be located. This is particularly important since vehicle datum point dimensions are commonly shown edge-to-edge rather than center-to-center.

While only a single embodiment of the present invention has been illustrated and described, it is not intended to be limited thereby but only by the scope of the appended claims.

We claim:

1. A measuring bridge including a main frame defining a reference plane,
   indexing means on said frame and defining coordinates in said plane,
   a plurality of support assemblies,
   coupling means for securing each support assembly in a discreet location relative to said reference plane and spaced a predetermined distance from each of the other support assemblies, said support assemblies each being adapted to be engaged by one of a plurality of datum points on the under side of a vehicle for supporting said vehicle in a predetermined orientation relative to said reference plane and the coordinates therein,
   first and second portable gauge means releasably mountable on said frame for determining the relative position of datum points on damaged portions of said vehicle relative to a reference datum point,
   said first portable gauge means including elongate bar means, first means for securing said first bar means to the indexing means of said main frame whereby said first bar means is fixed in said plane and lies in parallelism with the center line of the vehicle, a first measuring device slideably mounted on said first bar means and having an elongate measuring element mounted thereon for movement in a direction normal to the vehicle center line,
   said second portable gauge means including elongate beam means, second means for releasably securing said beam means on said main frame independently of said indexing means, said beam means being rotatably mounted about said second means,
   a second elongate measuring element mounted on said beam means for vertical movement in a direction normal to said reference plane for locating a first datum point below said vehicle,
   a second measuring device slideably mounted on said beam means and having a third measuring element mounted thereon for movement in a direction normal to said reference plane,
   said beam means being pivotal into engagement with the end of said first elongate measuring element thereby locating said third elongate element in predetermined coordinates relative to said reference plane with the elevation of the upper end of said third elongate element three dimensionally locating a second datum point below said vehicle relative to said first datum point and to said reference plane.

2. The measuring bridge set forth in claim 1 wherein said second means includes a magnetic coupler mounted adjacent one end of said elongate beam means, said main frame being of a ferrous material whereby said magnetic coupler is attachable magnetically to said frame means, said beam means being pivotally connected to said magnetic coupler whereby said beam means may pivot in a plane parallel to said reference plane and about an axis passing through said magnetic coupler.

3. The measuring bridge set forth in claim 3 wherein said first measuring device includes a slide mounted on said bar means for longitudinal movement thereon, a body mounted on said slide means for supporting said elongate measuring element parallel to said reference plane and lying in a plane perpendicular to the longitudinal axis of said elongate bar means and measuring means disposed on said bar means for indicating the position thereon of said slide and on said elongate measuring element to indicate the position thereof on said body.

4. The measuring bridge set forth in claim 1 wherein said first measuring device includes a slide mounted on said bar means for longitudinal movement thereon, a body mounted on said slide means for supporting said elongate measuring element parallel to said reference and lying in a plane perpendicular to the longitudinal axis of said elongate bar means and measuring means disposed on said bar means for indicating the position thereon of said slide and said elongate measuring element to indicate the position thereof on said body.

5. The measuring bridge set forth in claim 1 wherein said main frame includes a plurality of spaced apart members each having a portion defining a surface coplanar with that of the other to define said reference surface, said indexing means including a plurality of holes formed in each of said portions and in a predetermined array, a plurality of cross members fixed to selected ones of the openings in said frame members and extending transversely thereof, each of said cross members having a surface formed thereon which is parallel to the reference surface, a plurality of openings formed in each of said cross members, at least one opening in each cross member lying in a plane which includes the center line of the vehicle, said first means including means engageable with the openings in said cross members for securing said elongate bar means in parallelism with the vehicle center line.

6. The measuring bridge set forth in claim 5 wherein said second measuring device includes a slide mounted on said elongate beam means for longitudinal movement thereon, said third measuring means including an elongate member extending perpendicular to the reference plane and measuring means disposed on said beam means for indicating the position thereon of said slide.

7. The measuring bridge set forth in claim 1 wherein said second measuring device includes a slide mounted on said elongate beam means for longitudinal movement thereon, said third measuring means including an elongate member extending perpendicular to the reference plane and measuring means disposed on said beam means for indicating the position thereon of said slide.

* * * * *